Sept. 19, 1950  L. G. RILEY  2,523,142
CONTROL SYSTEM
Filed May 7, 1946
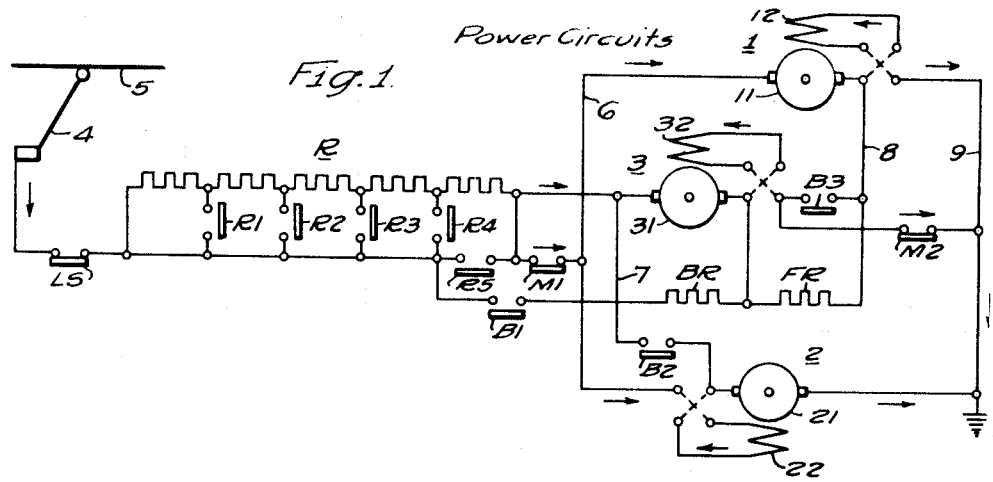
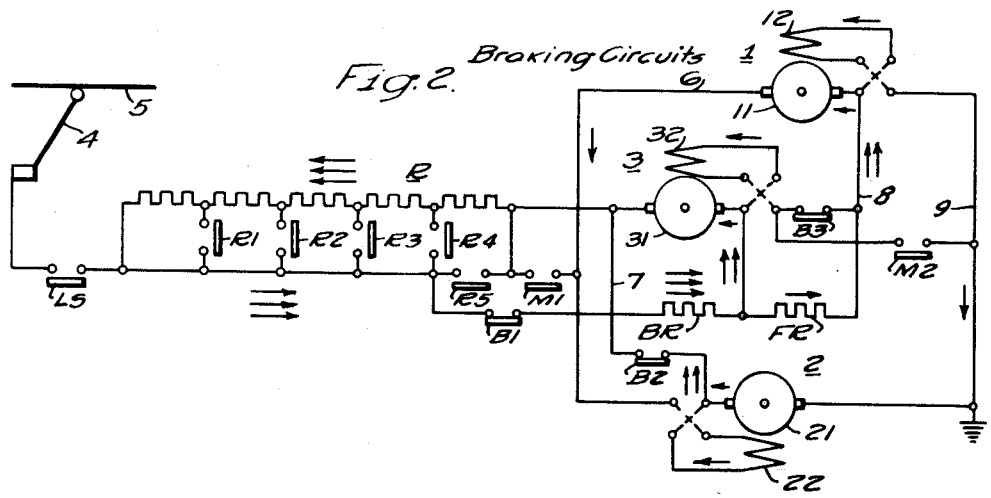
Fig. 3.
| | | LS | M1 | M2 | R1 | R2 | R3 | R4 | R5 | B1 | B2 | B3 |
|---|---|---|---|---|---|---|---|---|---|---|---|---|
| Power On | 1 | O | O | O | | | | | | | | |
| | 2 | O | O | O | O | | | | | | | |
| | 3 | O | O | O | O | O | | | | | | |
| | 4 | O | O | O | O | O | O | | | | | |
| | 5 | O | O | O | O | O | O | O | | | | |
| | 6 | O | O | O | O | O | O | O | O | | | |
| Braking | 1 | | | | | | | | | O | O | O |
| | 2 | | | | | O | | | | O | O | O |
| | 3 | | | | | O | O | | | O | O | O |
| | 4 | | | | | O | O | O | | O | O | O |
| | 5 | | | | | O | O | O | O | O | O | O |
| | 6 | | | | | O | O | O | O | O | O | O |
WITNESSES:
E. G. M'Closkey
N. G. Elliott
INVENTOR
Lynn G. Riley.
BY
G. M. Crawford
ATTORNEY Patented Sept. 19, 1950

2,523,142

UNITED STATES PATENT OFFICE 2,523,142

CONTROL SYSTEM

Lynn G. Riley, Pittsburgh, Pa., assignor to Westinghouse Electric Corporation, East Pittsburgh, Pa., a corporation of Pennsylvania Application May 7, 1946, Serial No. 667,760

7 Claims. (Cl. 318—63)

My invention relates, generally, to control systems and, more particularly, to systems for controlling the acceleration and dynamic braking of the propelling motors of electric vehicles, such as mining locomotives and the like.

An object of my invention, generally stated, is to provide a control system which shall be simple and efficient in operation and which may be economically manufactured and installed.

A more specific object of my invention is to provide an accelerating and dynamic braking system for three motors.

Another object of my invention is to secure equal dynamic braking effects from the motors of a three-motor locomotive.

Other objects of my invention will be explained fully hereinafter or will be apparent to those skilled in the art.

In accordance with one embodiment of my invention, resistance is so connected in the dynamic braking circuits for three motors that all motors are subjected to the same braking voltage and regulation, and, therefore, have equal braking effects.

For a fuller understanding of the nature and objects of my invention, reference may be had to the following detailed description, taken in conjunction with the accompanying drawing, in which:

Figure 1 is a diagrammatic view of a control system embodying the principal features of my invention and showing the power or accelerating circuits for the motors;

Fig. 2 is a view, similar to Fig. 1, showing the dynamic braking circuits for the motors, and Fig. 3 is a chart showing the sequence of operation of the apparatus illustrated in Figs. 1 and 2.

Referring to the drawing, and particularly to Fig. 1, the system shown therein controls the acceleration of three motors; 1, 2 and 3, which may be of the series type suitable for propelling an electric vehicle, such as a mining locomotive (not shown). The motor 1 has an armature winding 11 and a series field winding 12. The motor 2 has an armature winding 21 and a series field winding 22. Likewise, the motor 3 has an armature winding 31 and a series field winding 32.

The power for operating the motors may be supplied through a current collector 4 which engages a trolley conductor 5. The trolley conductor 5 may be energized from any suitable source of power, such as a power generating station (not shown).

The motors may be connected to the power source in parallel-circuit relation by means of switches LS, M1 and M2. A resistor R is provided for controlling the motor current during acceleration of the motors. Resistor-shunting switches R1, R2, R3, R4 and R5 are provided for shunting the resistor R, step-by-step, in a manner well known in the art. The resistor-shunting switches are closed in sequential relation, as indicated by the sequence chart in Fig. 3.

When the motors are connected to the power source by closing the switches LS, M1 and M2, the current flows through the motors in substantially equal amounts, as indicated by the arrows in Fig. 1. It will be noted that the current for all three motors flows through the resistor R when the motors are first connected to the power source. The resistor R is then shunted from the motor circuit, step-by-step, by the closing of the resistor-shunting switches R1 to R5 inclusive, as indicated in the sequence chart.

When it is desired to decelerate the vehicle by means of dynamic braking, the switches LS, M1 and M2 are opened, and the switches B1, B2 and B3 are closed, thereby establishing dynamic braking connections for the motors. As indicated by the arrows in Fig. 2, the motors 1 and 2 generate on a common loop through the starting resistor R and the permanent braking resistor BR in the conventional manner. Thus, the current flows from one terminal of the armature winding 11 of the motor 1 through conductor 6, the field winding 22 of the motor 2, the switch B2, conductor 7, the resistor R, the switch B1, the braking resistor BR and through either the field winding 32 of the motor 3 and the switch B3 or through a resistor FR to a conductor 8, and thence to the other terminal of the armature 11. At the same time, current flows from one terminal of the armature 21 through the switch B2, conductor 7, the resistor R, the switch B1, the braking resistor BR, either the field winding 32 and the switch B3 or through the resistor FR to the conductor 8, and thence through the field winding 12 of the motor 1 and conductor 9 to the other terminal of the armature 21.

It will be noted that the resistor FR is connected in parallel-circuit relation to the field winding 32 of the motor 3. Thus, by making the resistance of the resistor FR equal to the resistance of the field winding 32, the current in the field winding 32 will be equal to substantially one-half the current generated by the motors 1 and 2. Therefore, since the field winding of the motor 1 is excited by the current generated by the motor 2, and the field winding of the motor 2 is excited by the current generated by the motor 1, the field windings of all three motors are excited by substantially equal amounts of current and, therefore, generate the same voltage since they operate at the same speed.

The current from the armature 31 of the motor 3 circulates through the resistor R and the braking resistor BR in the same manner as does the current from the motors 1 and 2. Therefore, since all three motors are subjected to the same braking voltage and regulation, they produce substantially equal braking effects. In this manner, dynamic braking is obtained without it being necessary to operate the reversing switches for the motors when changing from power operation to dynamic braking operation. The resistor-shunting switches R1 to R5 are closed in sequential relation during dynamic braking in the same manner as during acceleration, as indicated by the sequence chart in Fig. 3.

From the foregoing description, it is apparent that I have provided a system which makes it possible to utilize dynamic braking on a locomotive having three motors. As explained hereinbefore, the motor current during dynamic braking is so controlled that all three motors have equal braking effects. The present system is particularly suitable for utilization on mining locomotives, but is not necessarily limited thereto.

Since numerous changes may be made in the above-described construction and different embodiments of the invention may be made without departing from the spirit and scope thereof, it is intended that all matter contained in the foregoing description or shown in the accompanying drawing shall be considered as illustrative and not in a limiting sense.

I claim as my invention:

1. In a control system, in combination, three motors, each motor having an armature winding and a series field winding, switching means for connecting the armature windings and the series field windings of the motors in parallel-circuit relation to accelerate the motors, additional switching means for establishing bridging dynamic braking circuit connections for the motors by connecting the series field winding of each one of two of said motors across the armature of the other one of said two motors, said dynamic braking circuit connections being such that the series field winding of the third one of said motors is connected in the bridging circuit for the other two motors and is excited by substantially one half the current generated by the other two motors, a resistor connected in the bridging circuit for controlling the current generated by all of said motors, the armature of the third motor being connected across said resistor, and an additional resistor connected across the series field winding of the third motor for controlling the amount of current in said field winding of the third motor.

2. In a control system, in combination, three motors, each motor having an armature winding and a series field winding, switching means for connecting the armature windings and the series field windings of the motors in parallel-circuit relation to accelerate the motors, additional switching means for establishing bridging dynamic braking circuit connections for the motors by connecting the series field winding of each one of two of said motors across the armature of the other one of said two motors, said dynamic braking circuit connections being such that the series field winding of the third one of said motors is connected in the bridging circuit for the other two motors and is excited by substantially one half the current generated by the other two motors, a resistor connected in the bridging circuit for controlling the current generated by all of said motors, means for shunting said resistor step-by-step, the armature of the third motor being connected across said resistor, and an additional resistor connected across the series field winding of the third motor for controlling the amount of current in said field winding of the third motor.

3. In a control system, in combination, a plurality of motors, each motor having an armature winding and a series field winding, switching means for connecting the armature windings and the series field windings of the motors in parallel-circuit relation to accelerate the motors, additional switching means for establishing bridging dynamic braking circuit connections for the motors by connecting the series field winding of each one of two of said motors across the armature of the other one of said two motors, said dynamic braking circuit connections being such that the series field winding of a third one of said motors is connected in the bridging circuit for said two motors and is excited by substantially one half the current generated by said two motors, a resistor connected in the parallel circuit during acceleration and in the bridging circuit during dynamic braking for controlling the current in all of said motors during both acceleration and dynamic braking, the armature of the third motor being connected across said resistor during dynamic braking, and an additional resistor connected across the series field winding of the third motor during dynamic braking for controlling the amount of current in said field winding of the third motor.

4. In a control system, in combination, three motors, each motor having an armature winding and a series field winding, switching means for connecting the armature windings and the series field windings of the motors in parallel-circuit relation to accelerate the motors, additional switching means for establishing bridging dynamic braking circuit connections for the motors by connecting the series field winding of each one of two of said motors across the armature of the other one of said two motors, said dynamic braking circuit connections being such that the series field winding of the third one of said motors is connected in the bridging circuit for the other two motors and is excited by substantially one half the current generated by the other two motors, a resistor connected in the parallel circuit during acceleration and in the bridging circuit during dynamic braking for controlling the current in all of said motors during both acceleration and dynamic braking, means for shunting said resistor step-by-step, the armature of the third motor being connected across said resistor during dynamic braking, and an additional resistor connected across the series field winding of the third motor during dynamic braking for controlling the amount of current in said field winding of the third motor.

5. In a control system, in combination, three motors, each motor having an armature winding and a series field winding, switching means for connecting the armature windings and the series field windings of the motors in parallel-circuit relation to accelerate the motors, additional switching means for establishing bridging dynamic braking circuit connections for the motors, said dynamic braking circuit connections being such that the field winding of each one of two of said motors is connected across the armature winding of the other one of said two motors and is excited by the current generated by the other one of said two motors and the field winding of the third motor is connected in the bridging circuit for the other two motors and is excited by substantially one half the current generated by the other two motors, means connected in the bridging circuit across the field winding of the third motor for controlling the amount of current in the field winding of the third motor, and a resistor connected in the bridging circuit for controlling the armature current of all the motors, the armature winding of the third motor being connected across said resistor.

6. In a control system, in combination, three motors, each motor having an armature winding and a series field winding, switching means for connecting the armature windings and the series field windings of the motors in parallel-circuit relation to accelerate the motors, additional switching means for establishing bridging dynamic braking circuit connections for the motors, said dynamic braking circuit connections being such that the field winding of each one of two of said motors is connected across the armature winding of the other one of said two motors and is excited by the current generated by the other one of said two motors and the field winding of the third motor is connected in the bridging circuit for the other two motors and is excited by substantially one half the current generated by the other two motors, resistance means connected in the bridging circuit across the field winding of the third motor for controlling the amount of current in the field winding of the third motor, and a resistor connected in the bridging circuit for controlling the armature current of all the motors, the armature winding of the third motor being connected across said resistor.

7. In a control system, in combination, three motors, each motor having an armature winding and a series field winding, switching means for connecting the armature windings and the series field windings of the motors in parallel-circuit relation to accelerate the motors, additional switching means for establishing bridging dynamic braking circuit connections for the motors, said dynamic braking circuit connections being such that the field winding of each one of two of said motors is connected across the armature winding of the other one of said two motors and is excited by the current generated by the other one of said two motors and the field winding of the third motor is connected in the bridging circuit for the other two motors and is excited by substantially one half the current generated by the other two motors, resistance means connected in the bridging circuit for controlling the amount of current in the field winding of the third motor, said resistance means being connected in parallel-circuit relation to the field winding of the third motor, and a resistor connected in the bridging circuit for controlling the armature current of all the motors, the armature winding of the third motor being connected across said resistor.

LYNN G. RILEY.

REFERENCES CITED

The following references are of record in the file of this patent:

UNITED STATES PATENTS

| Number | Name | Date |
|---|---|---|
| Re. 14,861 | Wright | May 18, 1920 |